United States Patent
New

(10) Patent No.: US 7,206,298 B2
(45) Date of Patent: Apr. 17, 2007

(54) CONDUCTING SEARCHES AMIDST ASYNCHRONOUS CELLS OF A COMMUNICATION SYSTEM

(75) Inventor: Wen Jing New, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 1291 days.

(21) Appl. No.: 09/948,373

(22) Filed: Sep. 6, 2001

(65) Prior Publication Data

US 2003/0045300 A1    Mar. 6, 2003

(51) Int. Cl.
*H04B 7/216* (2006.01)
*H04Q 7/00* (2006.01)
*H04J 3/06* (2006.01)

(52) U.S. Cl. .................. 370/331; 370/335; 370/350

(58) Field of Classification Search ............. 370/335, 370/342, 350, 503, 331
See application file for complete search history.

(56) References Cited

U.S. PATENT DOCUMENTS

| 4,901,307 A | 2/1990 | Gilhousen et al. |
| 5,103,459 A | 4/1992 | Gilhousen et al. |
| 6,246,673 B1 * | 6/2001 | Tiedemann et al. ......... 370/333 |

* cited by examiner

*Primary Examiner*—Chau Nguyen
*Assistant Examiner*—Michael Chuen
(74) *Attorney, Agent, or Firm*—Philip R. Wadsworth; Thien T. Nguyen; S. Hossain Beladi

(57) ABSTRACT

Methods and apparatus are presented for scheduling asynchronous neighboring cells within a wireless communication system. The Neighbor Set is apportioned into a Synchronated Neighbor Set and an Asynchronous Neighbor Set. Rather than performing a full frame timing acquisition search upon the Neighbor Set, only portions of the full frame timing acquisition search are selectively applied to the Asynchronous Neighbor Set. In addition, a synchronous search is performed on the Synchronated Neighbor Set.

30 Claims, 4 Drawing Sheets

CONDUCTING SEARCHES AMIDST ASYNCHRONOUS CELLS OF A COMMUNICATION SYSTEM

BACKGROUND

1. Field

The present invention relates generally to communications, and more specifically, to a system for conducting searches among asynchronous cell sites.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ *Generation Partnership Project "3GPP"*, Document Nos. 3G TS 25.211, 3G TS 25.212, 3G TS 25.213, and 3G TS 25.214.

Transmissions between component parts of a WCDMA system can be sent in a time division duplex mode (TDD) or a frequency division duplex mode (FDD), in accordance with the frequency bands available to a service provider. Due to the complexity of permitting operations in either mode, the system transmits information in accordance with logical channels and physical channels. (Logical channels are also referred to as transport channels in the WCDMA standard.) Data is encoded and interleaved according to the logical channel to which the data is assigned, and the logical channels are then mapped onto physical channels. The number and types of logical channels and physical channels vary depending upon the direction the signal is being sent. Transmissions from the mobile station to the base station are referred to as the "uplink" and the transmissions from the base station to the mobile station are referred to as the "downlink."

Signals or data transmitted over a physical channel are carried in message entities, which are constructed using radio frames. Each radio frame comprises 15 slots and each slot corresponds to 2560 chips. A "chip" refers to a bit in a sequence formed after the original information signal is spread with a spreading code. Hence, each radio frame comprises 38,400 chips. However, message entities are variable in length since each message entity can be distributed and transmitted in a variable number of radio frames. In the current WCDMA standard, radio frames are designated as 10 ms in duration, and message entities can comprise 1, 2, 4, or 8 radio frames.

A WCDMA service provider may set up base stations in an asynchronous mode, such that each base station has an independent timing reference. In order to operate within the range of such asynchronous base stations, a mobile station must be able to acquire the frame timing of each base station with which the mobile station wishes to communicate. To receive and decode variable length message entities from a base station properly, the mobile station must first acquire the frame timing of the base station through an acquisition search for signals that convey the base station's frame timing information. Hence, if there are multiple base stations, the mobile station must conduct multiple acquisition searches for the timing of each base station with which the mobile station wishes to communicate.

The computational complexity and the amount of time required to conduct such acquisition searches can be extremely problematic for a mobile station that is traveling within the range of multiple base stations. In particular, if the mobile station moves from the range of one base station to the range of another base station, a delay in frame timing signal acquisition of the new base station can result in dropped calls. The process of maintaining a call while the mobile station travels from the communication range of a base station to another base station is referred to as a "hand-off." Hand-offs can occur between sectors of a base station, between base stations of a single service provider, between base stations of different service providers, and between base stations operating at different frequencies. Hence, a traveling mobile station will likely experience the need to acquire frame timing information from multiple base stations. Unfortunately, the process of performing multiple acquisition searches quickly drains the battery life and processing resources of the mobile station.

There is a present need in the art to perform acquisition searches that will increase the likelihood of successful handoffs between asynchronous base stations, optimize the battery life of a mobile station, and minimize the allocation of processing resources within the mobile station. The embodiments described herein satisfy the aforementioned needs by implementing a system for conducting searches within new classifications of neighboring base stations.

SUMMARY

Methods and apparatus are presented herein to address the needs described above. In one aspect, a method is presented for substituting a full frame timing acquisition search with a partial frame timing acquisition search, the method comprising the steps of: classifying a plurality of base stations into a plurality of candidate sets; determining whether the full frame timing acquisition search needs to be performed upon at least one of the plurality of candidate sets; if the full frame timing acquisition search needs to be performed upon the at least one of the plurality of candidate sets, then substituting the partial frame timing acquisition search for the full frame timing acquisition search; and if the full frame timing acquisition search does not need to be performed upon the at least one of the plurality of candidate sets, then determining whether to perform a synchronous search.

In another aspect, a method is presented for acquiring frame timing information for a plurality of base stations, the method comprising the steps of: dividing the plurality of base stations into an Active Set, a Synchronated Neighbor Set, and an Asynchronous Neighbor Set; implementing a synchronous search upon the Active Set and the Synchronated Neighbor Set; and implementing a fragmented acquisition search upon the Asynchronous Set rather than a full acquisition search.

DETAILED DESCRIPTION

Figure 1:
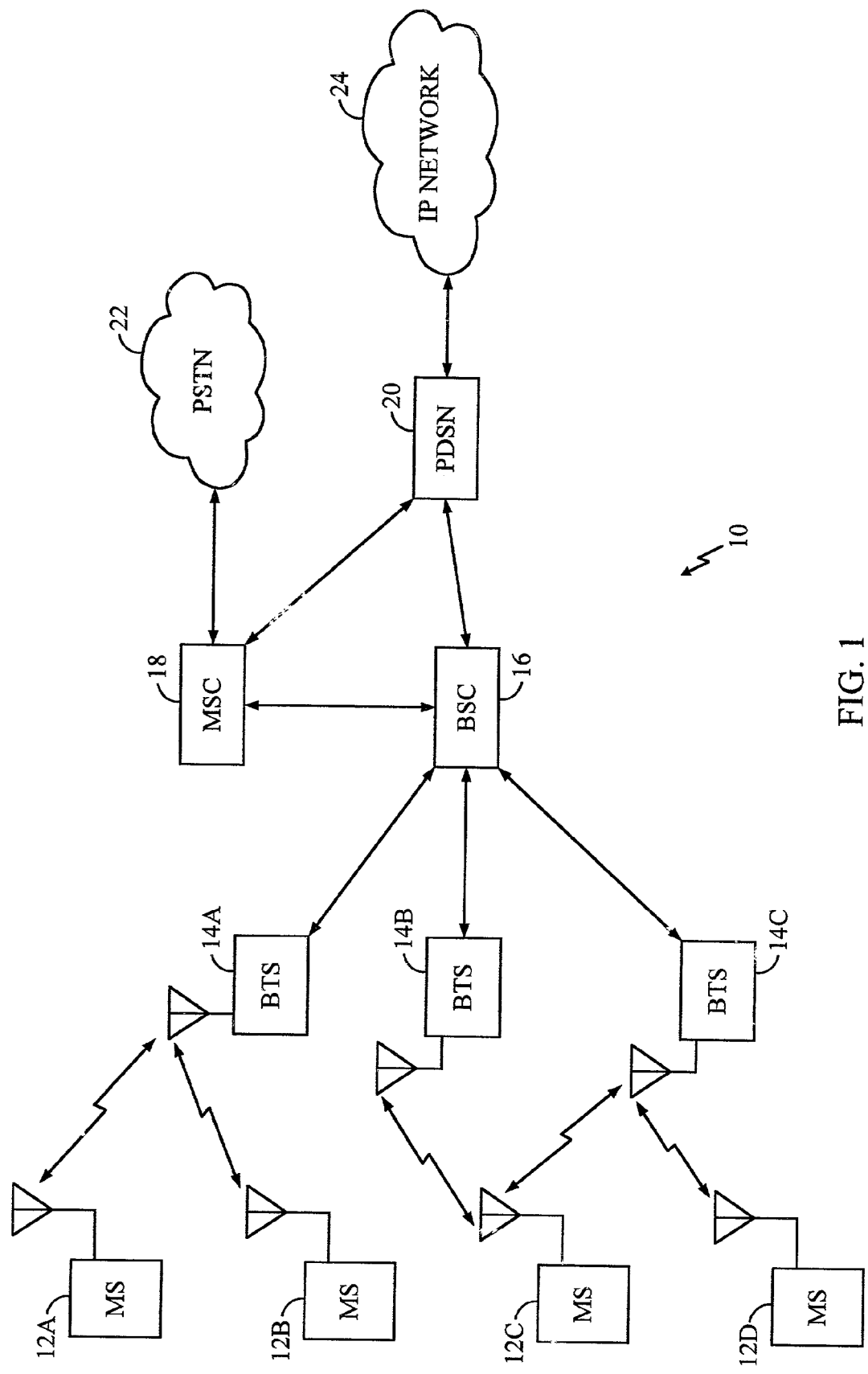
FIG. 1 is a diagram of a wireless communication network.

As illustrated in FIG. 1, a wireless communication network 10 generally includes a plurality of mobile stations (also called subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of uplink signals from various mobile stations 12a–12d engaged in telephone calls, Web browsing, or other data communications. Each uplink signal received by a given base station 14a–14c is processed within that base station 14a–14c. Each base station 14a–14c may communicate with a plurality of mobile stations 12a–12d by modulating and transmitting sets of downlink signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

As stated previously, a WCDMA communication system can be set up with asynchronous base stations such that neighboring base stations have timing references that are independent from each other and from the base station with which the mobile station is currently communicating. In a hand-off situation between a first asynchronous base station and a second asynchronous base station, a mobile station will drop a call if the mobile station cannot be properly synchronized with the second asynchronous base station. In order to be synchronized with the second asynchronous base station, the mobile station must possess the very accurate frame timing information of the second asynchronous base station and report the accurate frame timing information to the network. In some implementations of the WCDMA system, the first asynchronous base station may possess the approximate timing information of the second asynchronous base station already and convey this approximate timing information to the mobile station. The mobile station uses this approximate timing information to facilitate the acquisition search for the accurate timing information of the second asynchronous base station. However, if the first asynchronous base station does not possess the timing information of the second asynchronous base station, then the mobile station is confronted with the task of determining the frame timing information by itself.

According to the WCDMA standard, the acquisition of timing information for a base station is implemented in a complex three-step process. In the First Step, the mobile station acquires the slot synchronization of a base station by searching for the Primary Synchronization Code (PSC) that is transmitted by the base station in the first 256 chips of each slot. The PSC is constructed using a generalized hierarchical Golay sequence and is always found at the beginning of a slot period. Hence, in order to determine the start of a 2560 chip slot period, the mobile station attempts to find correlation peaks of the PSC correlating all possible chip positions.

After the slot timing is determined, the mobile station must determine where the start of the radio frame may be. In the Second Step, the mobile station acquires the frame synchronization of the base station by searching for the sequences of the Secondary Synchronization Codes (SSC) that are transmitted by the base station in the first 256 chips of each slot, along with the PSC. In the WCDMA standard, 64 sequences are constructed from the 16 orthogonal SSCs to divide 512 different Primary Scrambling Codes into 64 scrambling code groups, wherein the SSCs are also orthogonal to the Primary Scrambling Codes. The search is performed by correlating the received signal with possible sequences constructed from the SSCs and then identifying the maximum correlation value. Since the SSC sequences are constructed so that a cyclic shift of one sequence is not equivalent to a cyclic shift of any other sequence, the determination of the SSC sequence can be used to identify the primary scrambling code group associated with the SSC sequence.

In the Third Step, the mobile station determines the identity of the base station by correlating pilot symbols with all possible Primary Scrambling Codes in the code group that has been identified through the Second Step search described above. Each base station can be identified by a unique Primary Scrambling Code, which is repeated at the start of every 10 ms radio frame. The scrambling codes are divided into 512 sets, wherein each set comprises one Primary Scrambling Code and 15 Secondary Scrambling Codes. The Primary Scrambling Codes are also classified into 64 scrambling code groups, each consisting of 8 Primary Scrambling Codes. The code group that is searched in the Third Step is identified by the SSC sequence found in the Second Step. Hence, once a code group is identified in the Second Step, the search through 512 Primary Scrambling Codes is simplified to a search through 8 Primary Scrambling Codes.

Figure 2:
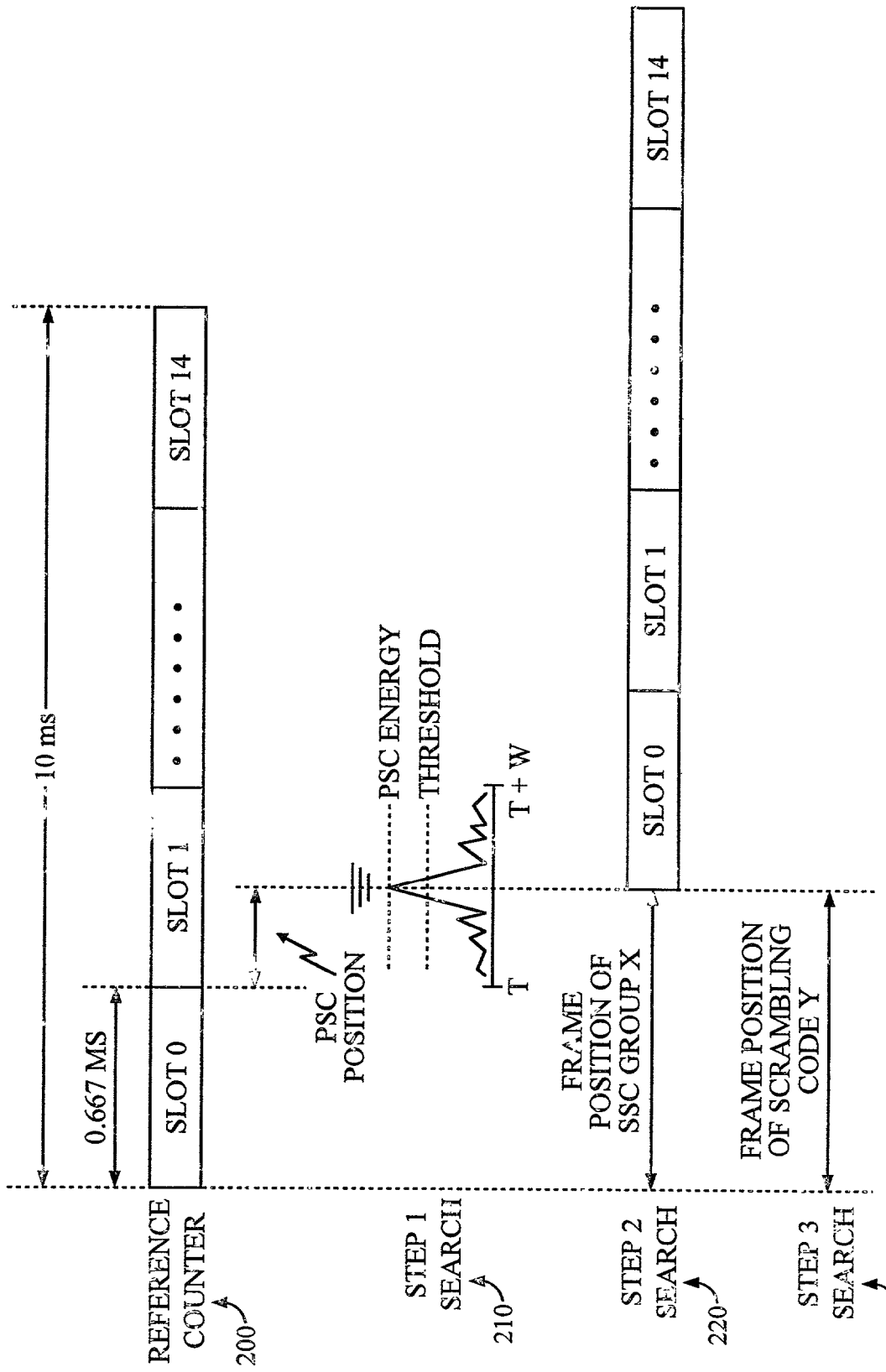
FIG. 2 is a timing diagram illustrating an acquisition search.

FIG. 2 illustrates the Three-Step frame acquisition search described above. A reference counter 200 represents a 10 ms radio frame comprising 15 slots that are 0.667 ms in duration. The First Step 210 searches for correlation peaks that are located at the start of the slots when a specific PSC is used. The Second Step 220 searches for the start of the radio frame by correlating slots with sequences constructed from SSCs. Once the start of the radio frame is identified, the Third Step 230 searches for the Primary Scrambling Code that is located in the first 256 chips at the start of the radio frame. Identification of the Primary Scrambling Code at the start of the radio frame serves to identify the base station that broadcast the radio frame.

Acquisition of the slot timing, frame timing, and base station identity is vital for conducting a hand-off of a mobile station from one base station to another. However, conducting an acquisition search in accordance with the full Three-Step Frame Timing Acquisition search consumes a significant amount of hardware resources, battery power, and DSP processing cycles. If too many acquisition searches are conducted, the mobile station will prematurely drain battery power. If too few acquisition searches are conducted, the mobile station may fail to detect a favorable hand-off opportunity and drop calls. The embodiments herein describe methods and apparatus for implementing a frame timing acquisition search that maintains connectivity while minimizing resource expenditures. The embodiments entail the generation of new base station candidate sets and effectively scheduling searches among asynchronous neighboring cells using the new base station candidate sets.

The general practice in WCDMA systems is to perform hand-offs by identifying the transmission energy levels of signals received from base station candidates and then classifying the base station candidates into either the Active Set (ASET) or a Neighbor Set (NSET). In the Idle Mode, wherein the mobile station is not maintaining a call but is ready to receive a call, the Active Set is the set containing the serving base station for the mobile station. In the Connected Mode, wherein the mobile station is maintaining a call, the Active Set is the set containing all base stations from which data is being actively demodulated and decoded by the mobile. The Neighbor Set contains all neighboring base stations specified by the WCDMA network or detected by the mobile station.

In one embodiment, a processor in the mobile station determines the energy levels and frame timing information of base stations in the Neighbor Set and reclassifies each base station into two new classifications. The classifications are the Synchronated Neighbor Set (S-NSET) and the Asynchronous Neighbor Set (A-NSET). Using these new categories within the Neighbor Set, the control processor then implements an optimal neighboring cell search scheduling algorithm among asynchronous base stations.

In one embodiment, after a base station candidate has been identified through the frame timing acquisition procedure described above, the base station candidate is classified within the Neighbor Set. Subsequent acquisition searches for that base station candidate within the Neighbor Set are performed by applying a small search window around the identified timing along with the base station candidate's scrambling code. Base station candidates whose timing can be identified in this manner are then classified as a member of the S-NSET. The acquisition search on S-NSET through the small search window is hereinafter referred to as a "synchronous search," whereas the acqustion search on A-NSET through the full Three-Step Frame Timing Acquisition search described above is referred to as an "asynchronous search."

Since a synchronous search searches a small window around a pre-identified timing position and only tests a single scrambling code, the synchronous search process is more power-efficient and resource-efficient than an asynchronous search, wherein the full Three-Step Frame Timing Acquisition procedure is performed upon multiple slots and multiple radio frames using multiple scrambling codes.

However, asynchronous searches must be performed to identify frame timing positions before synchronous searches can take place. As a mobile station moves from the range of one cell to another cell, frequent asynchronous searches may be needed to identify different neighboring cells. The present embodiments balance the need for asynchronous searches with synchronous searches by the use of the new base station candidate sets.

Figure 3:
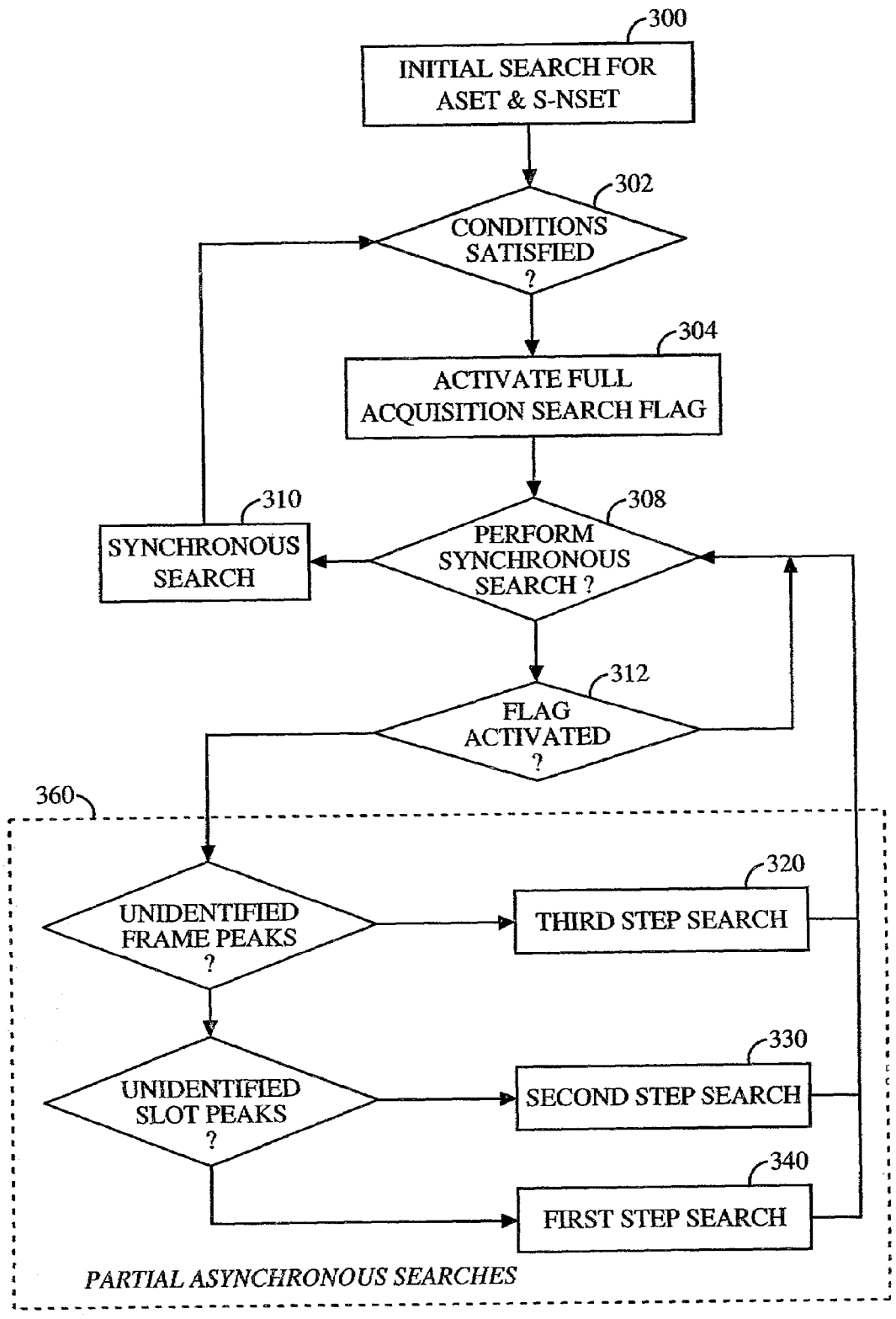
FIG. 3 is a flow chart of a method for using a divided Neighbor Set to perform a partial acquisition search, rather than a full acquisition search.

FIG. 3 is a flow chart illustrating an embodiment of a searching algorithm that minimizes the need to conduct frequent full Three-Step Frame Timing Acquisition searches. The searching algorithm can be implemented by an additional processing element and memory element within the mobile station, or the searching algorithm can be introduced into processing elements and memory elements that are already present within the mobile station. The searching algorithm of FIG. 3 minimizes the need to conduct frequent full Three-Step Frame Timing Acquisition searches by substituting the full Three-Step Frame Timing Acquisition search with a partial frame timing acquisition search or multiple partial frame timing acquisition searches.

At step 300, a processor in the mobile station controls initial full acquisition searches that determine membership in ASET and S-NSET. In other words, the mobile station classifies the base stations in the network that are candidates for communication sessions. At step 302, the processor determines whether the number of S-NSET elements is less than a predetermined quantity and whether the last search of the A-NSET has occurred more than a predetermined duration ago. The conditions examined at step 302 determine whether a full Three-Step Frame Timing Acquisition search needs to be performed upon elements of A-NSET. If the conditions for performing a full Three-Step Frame Timing Acquisition search are affirmed, then a flag for a full acquisition search is activated at step 304. Alternatively, if the conditions for performing a full Three-Step Frame Timing Acquisition search are not affirmed, then a flag for a full acquisition search is deactivated.

The program flow proceeds to step 308, wherein an analysis of search timers occurs in order to determine whether to perform a synchronous search among ASET and S-NSET base stations. Since elements of ASET and S-NSET comprise those base stations whose timing information is already known to the mobile station, a search only needs to be performed within a small window surrounding the last known frame boundary. In one embodiment, the search window is 192 chips wide, however any value between 100 to 300 chips can be implemented to accommodate system restraints. A search timer for searching ASET base stations and a search timer for searching S-NSET base stations are checked to determine whether to perform a synchronous search among elements of said sets. If the search timers have expired, then synchronous searches are performed for each of said sets at step 310 and the program flow proceeds back to step 302. After step 308, the program flow proceeds to step 312, wherein a determination as to whether the flag for a full acquisition search is activated or deactivated.

If the flag is deactivated, then the program flow proceeds back to step 308 to determine again whether to perform a synchronous search. If the flag is activated, then fragments of the full Three-Step Frame Timing Acquisition search are performed independently upon A-NSET base stations at steps 320, 330 and 340. In other words, if the flag is activated, a fragmented acquisition search step 360 is substituted for the full Three-Step Frame Timing Acquisition search. The fragmented acquisition search step 360 comprises the performance of various partial searches in accordance with conditions determined by the processor. If a determination is made that unidentified frame peaks exist in the transmission signals, then a Third Step search is performed at step 320. If all frame peaks are identified but unidentified slot peaks exist, then a Second Step search is performed at step 330. If all frame peaks are identified and all slot peaks are identified, then a First Step search is performed at step 340. The program flows from steps 320, 330, and 340 proceed back to step 308.

Figure 4:
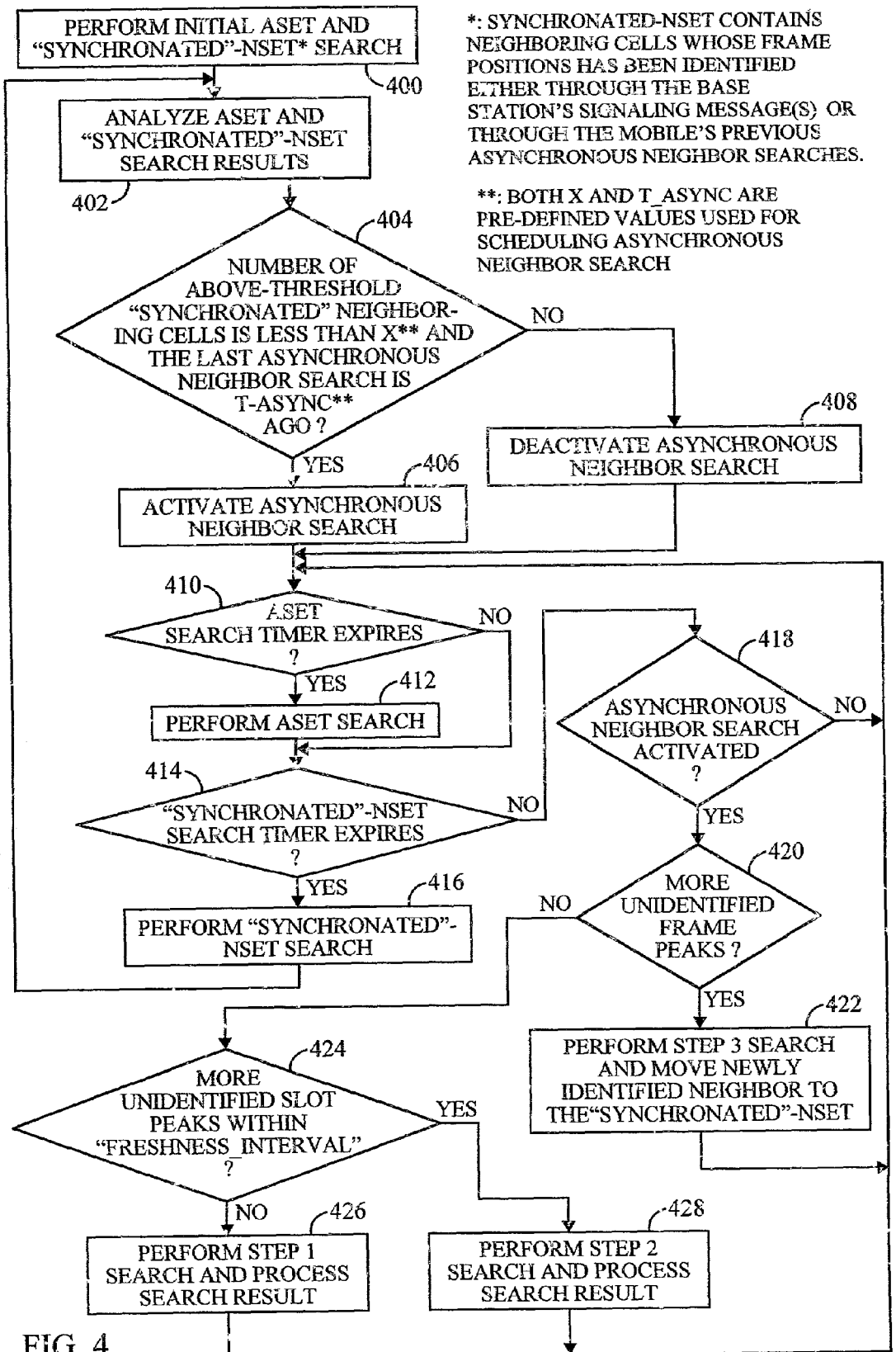
FIG. 4 is a flow chart of another method for using a divided Neighbor Set to perform a partial acquisition search, rather than a full acquisition search.

FIG. 4 is a detailed flow chart illustrating a more detailed embodiment of the general method described in FIG. 3. At step 400, a processor in the mobile station initiates a full Three-Step Frame Timing Acquisition search of at least one asynchronous base station to establish the initial ASET and S-NSET member elements. At step 402, the processor analyses the ASET and S-NSET search results. In one embodiment, the analysis of the ASET and S-NSET search results is based on an analysis of received energy levels and a determination as to the duration since the last full frame timing acquisition search. In particular, the processor determines whether a number of S-NSET elements exceed a predefined energy threshold $E_T$. The processor then determines whether that number of S-NSET elements exceeds a predefined quantity X. If the number of S-NSET elements that exceed $E_T$ is less than X, then the processor also determines whether the last frame timing acquisition search upon A-NSET elements occurred at least $T_{async}$ milliseconds ago. The order of the processing steps to conduct this analysis can be interchanged without affecting the scope of the embodiment.

At step 404, if the number of S-NSET elements that exceed $E_T$ is less than X and the last frame timing search of the A-NSET was $T_{async}$ milliseconds ago or longer, then at step 406, the processor flags a need to implement a frame timing acquisition search among the elements of A-NSET. If the number of S-NSET elements that exceed $E_T$ is more than X or the last full three-step frame timing search was less than $T_{async}$ milliseconds ago, then the processor refrains from flagging a frame timing acquisition search among A-NSET.

At step 410, the processor further determines whether the ASET search timer has expired. If the ASET search timer has expired, then the processor implements a synchronous search of the ASET at step 412. If the ASET search timer has not expired, then the program flow proceeds to step 414, wherein the processor determines whether the S-NSET search timer has expired. If the S-NSET search timer has expired, then at step 416, the processor performs a synchronous search of the S-NSET. The program flow then proceeds back to step 402.

If the processor determines that the S-NSET search time has not expired, then at step 418, a determination is made as to whether a full frame timing acquisition search of A-NSET base stations has been activated, i.e., whether the program flow had proceeded from step 406 or step 408. If the full frame timing acquisition search of A-NSET had not been activated, then the program flow proceeds back to step 410. If the full frame timing acquisition search of A-NSET had been activated, the program flow proceeds to step 420.

At step 420, the processor determines whether the search of the A-NSET has found more unidentified frame peaks. An unidentified frame peak represents a base station that has not been identified. If the search of the A-NSET has found unidentified frame peaks, then the program flow proceeds to step 422, wherein the processor implements a Third Step partial search by correlating pilot symbols with a scrambling code. When the base station is identified through the identification of the scrambling code, the program flow proceeds back to step 410.

If the processor determines that all frame peaks correspond to identified base stations, then the program flow proceeds to step 424. At step 424, a determination is made as to whether there are unidentified slot peaks within a predefined freshness interval. A freshness interval is a durational period used to determine whether a previously measured PSC peak is too old for use in a Second Step search. For example, if the freshness interval is defined as 500 ms, then PSC peaks that were collected over 500 ms ago will not be used for further Second Step searches. If the unidentified slot peaks are not within the predefined freshness interval, then the program flow proceeds to step 426, wherein the processor implements a Second Step partial search by correlating the sequences of the Secondary Synchronization Codes (SSC). The program flow then proceeds back to step 410. If the unidentified slot peaks are within the predefined freshness interval, then the program flow proceeds to step 428, wherein the processor implements a First Step partial search by searching for slot timing through the use of Primary Synchronization Codes (PSC). The program flow then proceeds back to step 410.

In the embodiment described above, asynchronous searches and synchronous searches are intertwined in order to guarantee search rates on ASET and S-NSET. Without a guaranteed search rate, the processor could take an inordinate amount of time to finish all of the partial step searches for an asynchronous search. For example, it is conceivable that one asynchronous search, as implemented by the embodiments above, could comprise a First Step search that results in a large number of PSC peaks over the entire slot space, several Second Step searches, wherein each Second Step search covers a few number of PSC peaks detected from the First Step search, and several Third Step searches, wherein each Third Step search results from a Second Step search.

Hence, to break up a cycle of multiple partial searches, a guaranteed search rate can be implemented in yet another embodiment so that the cycle is refreshed. A guaranteed search rate ensures that the demodulation elements of the mobile station are assigned to the best signal paths. In addition, the guaranteed search rate ensures that the timing information of the ASET and SNSET cells are properly maintained, the idle mode cell reselections (idle handoffs) are promptly performed, and the connected mode handoff event reports are promptly triggered. A guaranteed search rate on ASET and S-NSET facilitates the ability of the network to maintain good call connections for the mobile station. In one embodiment, the search through ASET elements occurs every 20 ms and the search through NSET elements occurs every 80 ms or 100 ms. Other search rates can be implemented without effecting the scope of the embodiments herein.

In another aspect of the embodiment, the values for the predefined quantity X, the predefined energy threshold $E_T$, and the duration $T_{async}$ can be dynamically adjusted by the processor based on the receiving energy levels of the elements in the Active Set. For example, if the receiving energy levels of a base station is good, e.g., between approximately −7 dB and −11 dB, then X can be decreased and $E_T$ can be decreased. If the transmission energy levels of a base station are bad, e.g., between approximately −15 dB and −20 dB, then X can be increased and $E_T$ can be increased. In addition, the minimum duration required for identifying a new base station also plays a role in determining the value for $T_{async}$.

Alternatively, or in combination with receiving energy levels, the values for the predefined quantity X, the predefined energy threshold $E_T$, and the duration $T_{async}$ can be dynamically adjusted based on whether the mobile station is in Idle mode or in Connected Mode.

The criterion incorporated within the method and apparatus described in FIG. 3 and FIG. 4 are used to accomplish two purposes. First, that the mobile station will detect a sufficient number of neighboring cells to detect possible handoff target base stations. Second, that the mobile station will not perform unnecessary frame timing acquisition searches, which consumes a large amount of hardware resources and battery power. In particular, full Three-Step Frame Timing Acquisition searches are unnecessary when the mobile station remains in the coverage of only one base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for substituting a full frame timing acquisition search with a partial frame timing acquisition search, comprising:

classifying a plurality of base stations into a plurality of candidate sets;

determining whether the full frame timing acquisition search needs to be performed upon at least one of the plurality of candidate sets;

if the full frame timing acquisition search needs to be performed upon the at least one of the plurality of candidate sets, then substituting the partial frame timing acquisition search for the full frame timing acquisition search; and if the full frame timing acquisition search does not need to be performed upon the at least one of the plurality of candidate sets, then determining whether to perform a synchronous search.

2. The method of claim 1, wherein determining whether to perform a synchronous search comprises:

determining whether a synchronous search timer has expired; and performing a synchronous search upon the remaining plurality of candidate sets if the synchronous search timer has expired.

3. The method of claim 2, wherein the synchronous search comprises:

searching through a small window around an identified timing using an identified scrambling code.

4. The method of claim 2, wherein if the full frame timing acquisition search needs to be performed upon the at least one of the plurality of candidate sets, the partial frame timing acquisition search comprises:

determining whether at least one unidentified frame peak exists;

if at least one unidentified frame peak exists, then correlating a plurality of pilot symbols with an identified code group of scrambling codes; and if unidentified frame peaks do not exist, then determining whether to perform a synchronous search upon the remaining plurality of candidate sets.

5. The method of claim 2, wherein if the full frame timing acquisition search needs to be performed upon the at least one of the plurality of candidate sets, the partial frame timing acquisition search comprises:

determining whether at least one unidentified slot peak exists while all frame peaks are identified;

if at least one unidentified slot peak exists while all frame peaks are identified, then correlating a received signal with a plurality of possible sequences constructed from a plurality of secondary synchronization codes; and if at least one unidentified slot peak does not exist while all frame peaks are identified, then determining whether to perform a synchronous search upon the remaining plurality of candidate sets.

6. The method of claim 2, wherein if the full frame timing acquisition search needs to be performed upon the at least one of the plurality of candidate sets, the partial frame timing acquisition search comprises:

determining whether all slot peaks are identified and all frame peaks are identified; and if all slot peaks are identified and all frame peaks are identified, then finding correlation peaks of a primary synchronization code correlating all chip positions of a received signal, correlating the received signal with a plurality of possible sequences constructed from a plurality of secondary synchronization codes, and correlating a plurality of pilot symbols with an identified code group of scrambling codes.

7. A method for acquiring frame timing information for a plurality of base stations, comprising:

dividing the plurality of base stations into an Active Set, a Synchronated Neighbor Set, and an Asynchronous Neighbor Set;

implementing a synchronous search upon the Active Set and the Synchronated Neighbor Set; and implementing a fragmented acquisition search upon the Asynchronous Set rather than a full acquisition search.

8. The method of claim 7, wherein implementing the fragmented acquisition search upon the Asynchronous Set comprises:

determining whether a frame peak in a radio frame is unidentified, wherein the radio frame is associated with a base station in the Asynchronous Set;

if the frame peak is unidentified, correlating a plurality of pilot symbols with a scrambling code, wherein the plurality of pilot symbols are associated with the radio frame; and if the frame peak is identified, refraining from correlating a plurality of pilot symbols with an identifying scrambling code, wherein the plurality of pilot symbols is associated with the radio frame.

9. The method of claim 8, wherein if the frame peak is identified, implementing the fragmented acquisition search upon the Asynchronous Set further comprises:

determining whether an unidentified slot peak occurred within a freshness interval;

if an unidentified slot peak occurred within the freshness interval, then correlating the plurality of pilot symbols with a plurality of sequences derived from Secondary Synchronization Codes; and if no unidentified slot peaks occur within a freshness interval, then refraining from correlating the plurality of pilot symbols with a plurality of sequences derived from Secondary Synchronization Codes.

10. The method of claim 9, wherein if no unidentified slot peaks lie within the freshness interval, then implementing the fragmented acquisition search upon the Asynchronous Set further comprises:

searching for slot timing information using a plurality of Primary Synchronization Codes.

11. The method of claim 10, wherein the freshness interval is 500 milliseconds in duration.

12. The method of claim 7, wherein implementing the fragmented acquisition search rather than a full acquisition search is triggered by at least one predetermined condition.

13. The method of claim 12, wherein the at least one predetermined condition is a determination that a predetermined number of base stations in the Synchronated Neighbor Set transmit in excess of a predefined energy threshold $E_T$, wherein $E_T$ is a variable system parameter.

14. The method of claim 13, wherein the at least one predetermined condition further comprise a determination that an acquisition search occurred at least $T_{asynch}$ milliseconds ago, wherein $T_{asynch}$ is a variable system parameter.

15. An apparatus for substituting a full frame timing acquisition search with a partial frame timing acquisition search, comprising:

a memory element; and a processor configured to execute a set of instructions stored within the memory element, the set of instructions for:

classifying a plurality of base stations into a plurality of candidate sets;

determining whether the full frame timing acquisition search needs to be performed upon at least one of the plurality of candidate sets;

if the full frame timing acquisition search needs to be performed upon the at least one of the plurality of candidate sets, then substituting the partial frame timing acquisition search for the full frame timing acquisition search; and if the full frame timing acquisition search does not need to be performed upon the at least one of the plurality of candidate sets, then determining whether to perform a synchronous search.

16. The apparatus of claim 15, wherein determining whether to perform a synchronous search comprises:
   determining whether a synchronous search timer has expired; and
   performing a synchronous search upon the remaining plurality of candidate sets if the synchronous search timer has expired.

17. The apparatus of claim 15, wherein the synchronous search comprises:
   searching through a small window around an identified timing using an identified scrambling code.

18. The apparatus of claim 15, wherein if the full frame timing acquisition search needs to be performed upon the at least one of the plurality of candidate sets, the partial frame timing acquisition search comprises:
   determining whether at least one unidentified frame peak exists;
   if at least one unidentified frame peak exists, then correlating a plurality of pilot symbols with an identified code group of scrambling codes; and
   if unidentified frame peaks do not exist, then determining whether to perform a synchronous search upon the remaining plurality of candidate sets.

19. The apparatus of claim 15, wherein if the full frame timing acquisition search needs to be performed upon the at least one of the plurality of candidate sets, the partial frame timing acquisition search comprises:
   determining whether at least one unidentified slot peak exists while all frame peaks are identified;
   if at least one unidentified slot peak exists while all frame peaks are identified, then correlating a received signal with a plurality of possible sequences constructed from a plurality of secondary synchronization codes; and
   if at least one unidentified slot peak does not exist while all frame peaks are identified, then determining whether to perform a synchronous search upon the remaining plurality of candidate sets.

20. The apparatus of claim 15, wherein if the full frame timing acquisition search needs to be performed upon the at least one of the plurality of candidate sets, the partial frame timing acquisition search comprises:
   determining whether all slot peaks are identified and all frame peaks are identified; and
   if all slot peaks are identified and all frame peaks are identified, then finding correlation peaks of a primary synchronization code correlating all chip positions of a received signal, correlating the received signal with a plurality of possible sequences constructed from a plurality of secondary synchronization codes, and correlating a plurality of pilot symbols with an identified code group of scrambling codes.

21. An apparatus for acquiring frame timing information for a plurality of base stations, comprising:
   a memory element; and
   a processor configured to execute a set of instructions stored within the memory element, the set of instructions for:
      dividing the plurality of base stations into an Active Set, a Synchronated Neighbor Set, and an Asynchronous Neighbor Set;
      implementing a synchronous search upon the Active Set and the Synchronated Neighbor Set; and
      implementing a fragmented acquisition search upon the Asynchronous Set.

22. The apparatus of claim 21, wherein implementing the fragmented acquisition search upon the Asynchronous Set comprises:
   determining whether a frame peak in a radio frame is unidentified, wherein the radio frame is associated with a base station in the Asynchronous Set;
   if the frame peak is unidentified, correlating a plurality of pilot symbols with a scrambling code, wherein the plurality of pilot symbols are associated with the radio frame; and
   If the frame peak is identified, refraining from correlating a plurality of pilot symbols with an identifying scrambling code, wherein the plurality of pilot symbols is associated with the radio frame.

23. The apparatus of claim 22, wherein if the frame peak is identified, implementing the fragmented acquisition search upon the Asynchronous Set further comprises:
   determining whether an unidentified slot peak occurred within a freshness interval;
   if an unidentified slot peak occurred within the freshness interval, then correlating the plurality of pilot symbols with a plurality of sequences derived from Secondary Synchronization Codes; and
   if no unidentified slot peaks occur within a freshness interval, then refraining from correlating the plurality of pilot symbols with a plurality of sequences derived from Secondary Synchronization Codes.

24. The apparatus of claim 23, wherein if no unidentified slot peaks lie within the freshness interval, then implementing the fragmented acquisition search upon the Asynchronous Set further comprises:
   searching for slot timing information using a plurality of Primary Synchronization Codes.

25. The apparatus of claim 23, wherein the freshness interval is 500 milliseconds in duration.

26. The apparatus of claim 21, wherein implementing the fragmented acquisition search rather than a full acquisition search is triggered by at least one predetermined condition.

27. The apparatus of claim 21, wherein the at least one predetermined condition is a determination that a predetermined number of base stations in the Synchronated Neighbor Set transmit in excess of a predefined energy threshold $E_T$, wherein $E_T$ is a variable system parameter.

28. The apparatus of claim 22, wherein the at least one predetermined condition further comprise a determination that an acquisition search occurred at least $T_{asynch}$ milliseconds ago, wherein $T_{asynch}$ is a variable system parameter.

29. An apparatus for substituting a full frame timing acquisition search with a partial frame timing acquisition search, comprising:
   means for classifying a plurality of base stations into a plurality of candidate sets and for determining whether the full frame timing acquisition search needs to be performed upon at least one of the plurality of candidate sets, wherein if the full frame timing acquisition search needs to be performed upon the at least one of the plurality of candidate sets, then the means is further for substituting the partial frame timing acquisition search for the full frame timing acquisition search, and if the full frame timing acquisition search does not need to be performed upon the at least one of the plurality of candidate sets, then the means is further for determining whether to perform a synchronous search.

30. An apparatus for acquiring frame timing information for a plurality of base stations, comprising:

means for dividing the plurality of base stations into an Active Set, a Synchronated Neighbor Set, and an Asynchronous Neighbor Set, for implementing a synchronous search upon the Active Set and the Synchronated Neighbor Set, and for implementing a fragmented acquisition search upon the Asynchronous Set.

* * * * *